Feb. 9, 1943.        C. P. WALKER        2,310,559
VIBRATION TRANSLATING MEANS
Filed Sept. 18, 1937
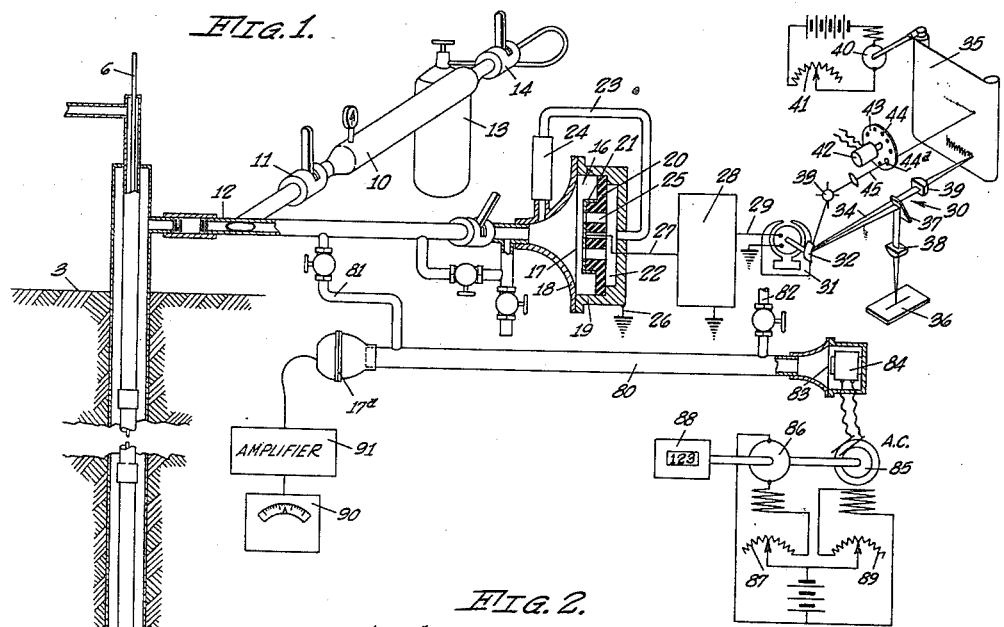
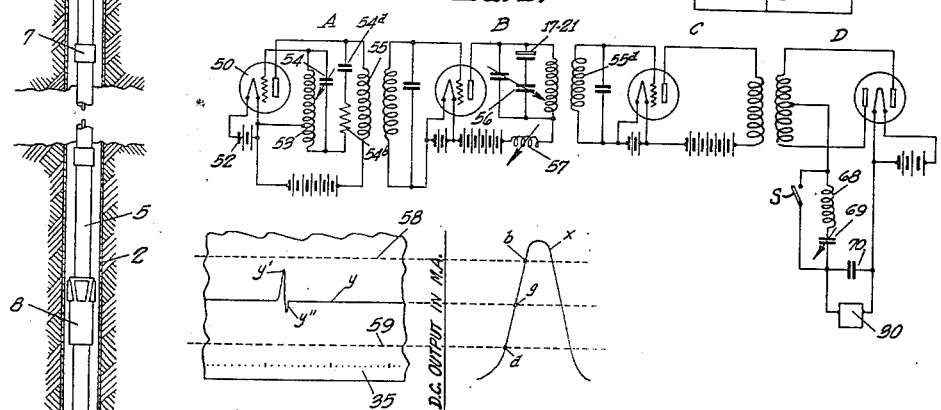
INVENTOR.
CRANFORD P. WALKER
ATTORNEY.

Patented Feb. 9, 1943

2,310,559

UNITED STATES PATENT OFFICE 2,310,559

VIBRATION TRANSLATING MEANS

Cranford P. Walker, San Marino, Calif.

Application September 18, 1937, Serial No. 164,534

12 Claims. (Cl. 177—352)

My invention relates to vibration translating means and has particular reference to the reception and translation of pressure waves such as are produced in the echo type of well surveying instruments, to translate the character, form and shape of the received waves or vibrations into graphs or records which may permit the observance and study of the shape, form or character of these waves.

In the measurement of well depths and the location and determination of obstructions of various characters in wells, particularly oil wells, by the pressure wave echo method, a pressure impulse is created in the well, which impulse travels down the well to the various obstructions or constrictions found in the well and is partially reflected by each of them, the reflected waves or echoes traveling back up the well to operate some suitable pressure responsive device which moves or vibrates in response thereto in accordance with the character, amplitude and form of the wave. The echoes or reflections from various different objects encountered within the well produce distinct pressure-time wave patterns for each of the objects or reflecting surfaces and it is desirable to reproduce these wave patterns so that their character, shape, form and relative amplitudes may be observed and studied in order to properly interpret them in terms of nature and character of the reflecting or obstructing devices.

These pressure waves or echoes may be received at the ground surface by mechanical or electrical pressure responsive devices, such as mechanical diaphragms or electrical microphones. It is difficult to construct mechanical receiving devices which will respond with sufficient sensitivity and accuracy to reproduce all the minute variations in the shape of the wave patterns and conventional electrical microphones and amplifiers, due to their inability to function with any degree of fidelity where the frequency is below the audible range, have also been found to be inadequate to correctly and completely reproduce the wave patterns in such form as to permit the ready and complete study of wave patterns.

It is therefore an object of my invention to provide a pressure responsive device which may be used for the reception and translation of the pressure waves or echoes to accurately reproduce pressure-time wave patterns corresponding in detail with the wave patterns of the pressure wave or echoes.

Another object of my invention is to provide a pressure responsive device for the reception and translation of vibrations of the character set forth which is extremely sensitive and which faithfully reproduces a wave pattern corresponding to the wave pattern of the vibrations.

Another object of my invention is to provide an electrical system for receiving pressure waves, echoes or other vibrations of the character set forth in which minute variations or changes in the wave patterns described by the vibrations may be received, observed and recorded.

Another object of my invention is to provide a system of the character set forth in the preceding paragraph wherein a novel microphone capable of varying its electrical impedance is placed in a high frequency tuned circuit adapted to produce a high frequency wave in the nature of a carrier wave and in which the microphone modulates the high frequency current which is then amplified and rectified to operate a direct current galvanometer, oscillograph or other suitable device for accurately indicating and recording the pressure variations received by the microphone.

Other objects and advantages of my invention will be apparent from a study of the following specification, read in connection with the accompanying drawing, wherein Fig. 1 is a diagrammatic view illustrating the adaptation of my vibration translating mechanism associated with a pressure wave echo well surveying system;

Fig. 2 is a diagrammatic view of one form of electrical circuit which may be employed to translate the received pressure variations into observable pressure-tme wave patterns or records;

Fig. 3 is a composite diagrammatic view illustrating the character of the wave patterns which may be reproduced upon a recording chart, compared with the characteristics of the direct current output circuit in accordance with changes in the air gap of the microphone employed in my system;

Fig. 4 is a diagrammatic view of a modified type of circuit which may be employed in the practice of my invention; and Fig. 5 is a diagrammatic view of a still further modified circuit which may be employed.

Referring to the drawing, I have illustrated my translation system as being associated with a pressure wave echo well surveying device such as that illustrated and claimed in my copending application Serial No. 162,699, filed September 7, 1937 which has now issued as United States Letters Patent No. 2,156,519.

In Fig. 1 I have illustrated an oil well 1 lined with the usual casing 2 which extends from the ground surface 3 to the bottom of the well. A pump 4 may be located at any desired depth in the well, the pump 4 being usually suspended upon a string of oil flow tubing 5 through which a string of sucker rods 6 extends to operate the moving part of the pump 4, the string of oil flow tubing 5 being usually constructed of a plurality of assembled sections of tubing coupled together by means of couplings 7. A tubing catcher 8 is usually disposed in the string of oil flow tubing. The pump 4 is usually secured to the lower end of the tubing string and lies within a perforated liner 9.

In making a survey to determine the location and character of any of a plurality of obstructions or constrictions of the cross sectional area of the casing 2 or enlargement of the well bore where it is not cased, a pressure impulse of any desired intensity may be introduced into or created within the well casing 2, preferably by either suddenly introducing into the well casing 2 a volume of gas at a pressure higher than the normal gas pressure within the casing 2 or allowing the sudden escape of a volume of the normal gas within the well to create a rarefaction impulse. The method and apparatus for creating the pressure impulse is described in my copending application hereinbefore referred to as consisting essentially of a pressure chamber 10 coupled through a quick opening valve 11 and a pipe 12 to the interior of the casing 2, the pressure chamber 10 being adapted to receive a volume of gas from a suitable tank or source of supply 13 through a valve 14 until the pressure within the chamber 10 has been built up to a desired value in excess of the value of the normal gas pressure within the casing 2. By then closing valve 14 and quickly opening valve 11, the gas within the chamber 10 may be suddenly released into the casing 2 and create a pressure impulse therein, which impulse travels as a pressure wave down the casing 2 and is partially reflected back by each of the various obstructions within the well, such as the tubing collars 7, the tubing catcher 8, the top of the liner 9 or any other obstruction which may be in the well and exposed above the fluid surface as well as partially reflected back by the surface 15 of the fluid within the well.

The pressure impulse and pressure wave may also be created by closing valve 14, opening valve 11 to allow the normal gases within the well to pass into the chamber 10, then closing valve 11 and opening valve 14 to exhaust the gases in the chamber 10 until the pressure therein reaches any predetermined value lower than the pressure within the well. By closing valve 14 and then reopening valve 11 quickly, a volume of the confined gas within the well is allowed to enter the chamber 10, creating a rarefaction impulse which travels down the well and back in the same manner as described for the introduction of pressure into the well.

The reflected impulses or waves, returning up through the casing 2, pass through the pipe 12 to a pressure responsive device 16 which includes a diaphragm 17 exposed to the pressures within the casing 2.

The pressure responsive device in this form of the invention is constituted by a condenser type microphone, the diaphragm 17 being constructed of a relatively thin sheet of duralumin, the outer edges of which are clamped between a pair of housing members 18 and 19. Disposed in the housing 19 is a mounting block 20 of insulating material, one face of which carries the opposite electrode of the condenser microphone, this electrode being illustrated as a cup-shaped member 21 of duralumin, the outer face of which is disposed parallel to the plane of the diaphragm 17 and spaced in relatively close juxtaposition thereto.

The housing member 19 forms with the diaphragm 17 a closed chamber 22 and, in order to make the diaphragm 17 sensitive to minute variations in pressure within the casing 2, I prefer to equalize the static pressure within the pipe 12 on both sides of the diaphragm 17 as by providing a somewhat restricted by-pass 23 communicating with the interior of the housing member 18 and with the chamber 22, a suitable filter 24 being interposed in the by-pass if desired to filter and dry the gases to prevent undue corrosion of the parts. A plurality of openings 25 are preferably provided through the electrode 21 and its supporting member 20 to avoid the building up of undesirable pressures between the diaphragm 17 and the electrode 21 by fluctuations of the diaphragm.

The diaphragm 17 may be grounded as indicated at 26 and the electrode 21 may be connected by a suitable wire 27 to an oscillator-amplifier-rectifier indicated generally at 28 and hereinafter more fully described, the output of which may be coupled as indicated at 29 to any suitable indicating or recording device indicated generally at 30. The indicating and recording device may be a recording galvanometer, oscillograph or other suitable device illustrated diagrammatically in Fig. 1 as including a galvanometer 31 which may be arranged to oscillate a mirror 32 receiving light from a suitable source 33 and directing the reflected beam 34 thereof upon a recording tape 35 or upon a suitable screen 36 where the movements of the beam, that is, the pressure-time wave pattern, may be observed, studied or recorded.

In the system diagrammatically illustrated in Fig. 1, the light beam 34 has a ribbon-like shape, a reflecting mirror 37 being interposed to intercept a portion of the beam and direct the same through a cylindrical condensing lens 38 upon the screen 36 while the remaining portion of the beam 34 passes through a suitable cylindrical condensing lens 39 to convert the same into a point beam where it may describe the wave pattern upon the tape 35. The tape 35 may be moved relative to the beam 34 in any suitable manner as by a variable speed motor 40 controlled by a rheostat or other device 41.

In view of the fact that the determination of the location of the various obstructions encountered by the pressure wave is made by comparing the wave pattern produced by the echoes from the various obstructions with relation to the time lapse between the creation of the pressure impulse in the casing 2 and the arrival of the echoes at the diaphragm 17, I prefer to describe upon the recording tape 35 a pattern of time lapse indications. One manner in which the same can be done readily is indicated in Fig. 1 as including a synchronous motor 42 arranged to drive an opaque disc 43 having a plurality of openings 44 therethrough aligned with a light beam 45 from the same light source 33 as we used to produce the beam 34, the openings 44 i the disc being arranged in such manner that during a predetermined time cycle a plurality of dots or marks will be produced by the beam 45 upon the record chart 35, one of the openings 44a being preferably larger than the remainder to make distinguishing marks upon the tape 35 indicative of the lapse of a multiple of the time units.

With the system just described, the vibrations or movements of the diaphragm 17 relative to the electrode 21 may be utilized to draw upon the chart 35 a faithful wave pattern corresponding to the wave pattern of the echoes received from each of the obstructions in the well, not only the large variations in the pressure but the minute variations thereof which change the character of the wave form or wave shape.

I prefer the translation mechanism indicated diagrammatically in Fig. 2 as comprising an electrical circuit including a relatively high frequency oscillator circuit A, a tuned amplifier circuit B in which the microphone 17—21 is interposed, an ordinary amplifier circuit C and a rectifier circuit D, producing a direct current output which may be fed directly into the galvanometer 30 or other oscillograph or recording apparatus capable of responding to direct current variations.

In Fig. 2 I have illustrated the oscillator circuit as including an ordinary vacuum tube 50, the grid circuit of which includes a coil 53 and a variable condenser 54 by which the circuit A may be tuned to oscillate at any desired frequency, preferably a moderately high frequency, ranging from approximately 10,000 cycles to 100,000 or more cycles per second, a blocking condenser 54a and a stabilizing resistor 54b connecting the grid circuit to the plate circuit in the usual manner.

The output of the tube in circuit B is coupled as indicated at 55a to a standard amplifier circuit C, the microphone 17—21 being included in this circuit and so connected that variations in the air gap between the diaphragm 17 and the electrode 21 will cause it to act as a variable condenser. A pair of variable condensers 56 is included in the circuit, one in series with the microphone 17—21, the other in shunt circuit relation to both the microphone 17—21 and the other of these variable condensers and so coupled together that an increase in the capacitance of one of the condensers is accompanied by decrease in the capacitance of the other. The condensers 56 are so arranged that the net capacitance of the network made up of condensers 56 and microphone 17—21 remains unchanged with adjustment of condensers 56. Since a decrease of the capacitance of the series part and an increase of the capacitance of the shunt part of condenser group 56 reduces the effect of microphone capacitance variation upon the net capacitance variation of the network, it is possible to adjust for pressure variation levels occurring under various circumstances. This allows operation of the associated carrier amplifier and recording equipment at an optimum level. The condensers 56 when so arranged do not affect the static tuning of the circuits with which they are associated. A rectifier circuit D, constituting a full wave rectifier, is coupled to the output of the amplifier circuit C while a direct current measuring or recording instrument 30 is connected to be supplied with current from the rectifier D. The direct current input to the recorder 30 is preferably adjusted to approximately one-half of its full scale value when no echoes are being received by the microphone as by adjusting the frequency of the oscillator circuit A or by adjusting the tuning of the amplifier circuit B so that the normal steady direct current supplied to the recorder 30 will centralize the light beam 34 on the chart 35.

The ouput circuit of B is normally detuned relative to the output frequency of the oscillator A so that variations in the air gap of the microphone 17—21 will tend to tune the circuit B or to further detune the same. By tuning the circuit B until the output of the rectifier circuit D is approximately one-half maximum, as indicated by the point g in Fig. 3, on the curve plotted by the direct current output in milliamperes against microphone air gap variation, the light beam will describe a straight line on the chart 35 when the pressure in the well casing 2 is static; that is, the line y on the chart 35 represents the normal position of the beam when no pressure variations are being transmitted to the diaphragm 17. However, a negative pressure wave striking the diaphragm 17 will open the air gap of the microphone 17—21, tuning the circuit B closer to the frequency of the oscillator and permitting a higher direct current output in the rectifier D and causing the light beam 34 to describe a peak or wave pattern $y'$, the shape and amplitude of which is in correspondence with the shape and amplitude of the wave pattern effecting the microphone. Similarly, a positive impulse striking the diaphragm 17 will cause a further detuning of the circuit B and cause a deflection of the light beam to describe a peak $y''$. The circuits are so proportioned that the maximum positive and negative deflections of the diaphragm 17 will describe a pattern within the limits of the points a and b on the straight line portion of the curve $x$, that is, lying between the limits indicated by dotted lines 58 and 59 on the chart 35.

By properly tuning the circuits A and B, the recorder or indicating instrument 30 may be caused to describe an observable wave pattern identical with the wave pattern received from the various obstructions in the well.

A modified form of circuit which may be employed is indicated in Fig. 4 wherein the microphone 17—21 is inserted in the oscillator circuit A so that any variation in the air gap in the microphone 17—21 varies the output frequency of the oscillator circuit A. The oscillator circuit A is illustrated as being coupled to a tuned amplifier circuit B which will pass more or less current to the rectifier D as the output frequency of the oscillator circuit A approaches the resonant frequency of the circuit B or recedes therefrom. Again the indicating or recording instrument 30 is connected to the output of the rectifier circuit D to be varied by the direct current output of this circuit.

In Fig. 5 I have illustrated a still further modified circuit which may be employed including a balanced alternating current circuit A which includes an alternating current generator 60 which may be of either the rotary or oscillator type, the output of which may be of any desired relatively high frequency, and is coupled to a balanced bridge rectifier circuit E including a pair of half wave rectifier tubes 61 and 62, the tube 61 being connected in one branch of the bridge including the secondary winding of a transformer 63 while the tube 62 is in the other branch including the secondary of the transformer 64. The primary circuit of the transformer 64 includes a variable impedance 65, permitting this circuit to be varied to balance the normal current in the two branches of the bridge, while the primary winding of the transformer 63 is in series with variable impedances 66 and with the microphone 17—21. The recorder or indicator 30 in this form of the device is connected in a shunt circuit extending between the junction of the secondary windings of the transformers 63—64 and the junction between the two rectifiers 61—62.

In this form of the device, when the combined effect of the impedances of the microphone 17—21 and its associated variable impedances 66 is equal to that of the variable impedance 65, the secondary voltages of the transformers 63—64 are equal and there is no potential impressed across the indicator or recorder 30. Any slight variations in the supply voltage or in the frequency supplied by the generator 60 will therefore be balanced and will not affect or be recorded by the recorder 30. A pressure wave or signal impinging upon the diaphragm 17 varies the impedance of the microphone 17—21, which in turn unbalances the secondary voltage of the two transformers, resulting in a voltage across the direct current recorder, the direction of which will depend upon whether the impedance of the microphone has been increased or decreased by the signal. In the usual form of this system, the circuits are preferably not tuned with respect to the high frequency carrier source. Sufficient sensitivity is available when the circuit is operated close to balance. Proper impedance matching of the bridge to the oscillator and recording circuit and utilization of the power capabilities of the circuit permit operation without amplification. Tuning of the coupling transformers 63 and 64 with their associated condenser circuits to the generator 60 frequency so that the variations of the microphone capacitance cause both bridge unbalance and microphone circuit tuning or detuning results in higher sensitivity but circuit adjustments when using such tuned arrangement are more difficult. The variable condensers 66 may be employed for varying the sensitivity of the microphone without changing the current passing through the transformer 63; that is, the condensers 66 should be so arranged that any increase in the impedance of one is balanced by a corresponding decrease in the impedance of the other.

In each of the circuits described, a reactor 68 and condensers 69 and 70 may be interposed in any portion of the circuits between the microphone and the galvanometer; for example, in the direct current output circuit, if desired, for filtering or for tuning the recorder circuit for the purpose of accenting certain of the periodically recurring echoes received from certain of the obstructions in the well, such as the echoes received from the tubing collars, the frequency of which ranges from 14 to 36 cycles per second.

Under some conditions encountered in wells a series of reflections from periodically occurring obstructions become obscure on the part of the record corresponding to the lower portion of the well due to excessive attenuation, oscillations in the instrument piping, reverberations in the well or to undesired echoes from pipe joints. The depth in the well to which these periodically occurring reflections can be recorded can be greatly increased through tuning of the recording circuit to a frequency corresponding to the number of collar or pipe joint echoes received per second. Narrowing of the frequency band recorded by the galvanometer in tuning, although depreciating the record detail, readily permits locating the well fluid level with respect to collars down to the fluid. The sharpness of tuning determines the attenuation characteristic so that the wave shape of the received reflections need not be smoothed any more than necessary, in order to bring the desired periodic reflection series up out of the background. In all cases the tuning is highly damped in order to prevent false records from shock excitation.

However, in order to permit the study of the particular wave forms of the echoes from the different obstructions, it is desirable to record the echoes without the accenting of the periodically recurring echoes from the tubing collars or pipe joints, which accenting tends to somewhat distort the precise wave pattern and for this purpose a switch S may be provided in a shunt circuit extending about the reactance 66 and condenser 69 which will when closed eliminate from the system the tuning or accenting effects.

Also one or more stages of amplification may be added in advance of the recorder 30 for the purpose of amplifying the signals received sufficiently to give a desired fluctuation of the recording beam.

As is described and claimed in my Patent No. 2,156,519 hereinbefore referred to, it is important to determine the pressure wave velocity in the particular well under measurement, this velocity being arrived at very readily if the location of one or more of the obstructions in the well is known. Where the location of these obstructions is not known, the velocity of the pressure wave through the particular gaseous medium in the particular well may be readily determined by passing gas from the well casing 2 through a velocity measuring tube 80 as by coupling one end of the tube 80 to the pipe 12 as by means of a pipe 81, the opposite end of the tube 80 being open to the atmosphere as indicated at 82, suitable valves being interposed in the inlet and outlet of the tube 80 to regulate the flow of gas therethrough.

At one end of the tube 80 I provide a diaphragm 83, preferably of magnetic material or in some manner arranged to be vibrated by alternating current supplied to a magnet 84. The alternating current may be supplied through a suitable generator 85 driven by a variable speed motor 86 controlled as to speed by means of a suitable rheostat 87 and provided with a revolution counter 88 or other indicator which will produce an indication of the frequency of current output of the generator 85 under variable speeds of operation of the motor 86. The output voltage and current of the generator 85 may also be variably controlled as by a rheostat 89.

By supplying current to the magnet 84, the diaphragm 83 may be vibrated at any desired frequency to produce pressure impulses in the tube 80 which will travel along the tube, engaging a diaphragm 17a of a standard microphone or a special microphone similar to microphone 17—21 hereinbefore described. By selecting the frequency of the output of the generator 85 such that a pressure impulse created by the diaphragm 83 will pass to the diaphragm 17a of the microphone and return to the diaphragm 83, synchronized with the production of another impulse by the diaphragm 83, the resulting resonance produced in the tube 80 with the particular gas from the well flowing therethrough may be noted upon a suitable output meter or oscillograph 90, the microphone 17a being coupled through a suitable oscillator-amplifier-rectifier circuit, indicated diagrammatically at 91, similar to any one of those illustrated in Figs. 2, 4 and 5 or through a standard radio type of amplifier. By noting the frequency applied to the diaphragm 83 to obtain resonance and the frequency necessary to apply to the diaphragm 83 to obtain resonance in the tube 80 with air flowing therethrough, a computation of the velocity of pressure waves in the particular gaseous medium in the well may be readily determined.

While I have illustrated and described herein a condenser type microphone, it will be understood by those skilled in the art that any type of microphone, the impedance of which is varied by the signal or pressure impulses received, thereupon may be employed.

While I have shown and described the preferred embodiment of my invention, I do not desire to be limited to any of the details of construction shown or described herein, except as defined in the appended claims.

I claim:

1. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the alternating current therein in accordance with pressure variations impinging on said microphone, and means coupled to said circuit and responsive to variations of said alternating current in said circuit for describing an observable wave pattern reproduction of the pressure variations in said well.

2. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the impedance of said circuit and to thereby vary said alternating current in accordance with the pressure variations impinging on said microphone, and means coupled to said circuit and responsive to said alternating current in said circuit for describing an observable wave pattern reproduction of the pressure variations in said well.

3. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the impedance of said circuit and to thereby vary said alternating current in accordance with the pressure variations impinging on said microphone, a pair of impedances in said circuit inversely variable relative to each other, one in series with said microphone and the other shunted across both said microphone and said first impedance for varying the effect of the microphone on said circuit, and means coupled to said circuit and responsive to variations of said alternating current in said circuit for describing an observable wave pattern reproduction of the pressure variations in said well.

4. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the impedance of said circuit and to thereby vary said alternating current in accordance with the pressure variations impinging on said microphone, means coupled to said circuit and responsive to variations of said alternating current in said circuit for describing an observable wave pattern reproduction of the pressure variations in said well, and electrical echo accenting means interposed between said microphone and said last named means for causing said system to respond more readily to periodically recurring echoes from a series of similar obstructions spaced substantially uniformly along the well than to pressure variations emanating from other sources.

5. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the impedance of said circuit and to thereby vary said alternating current in accordance with the pressure variations impinging on said microphone, means coupled to said circuit and responsive to variations of said alternating current in said circuit for describing an observable wave pattern reproduction of the pressure variations in said well, electrical echo accenting means interposed between said microphone and said last named means for causing said system to respond more readily to periodically recurring echoes from a series of similar obstructions spaced substantially uniformly along the well than to pressure variations emanating from other sources, and means associated with said accenting means and operable at will for imposing said accenting means upon said system or for removing the effect of said accenting means from said system.

6. In a system for receiving and translating pressure echoes from a well, a microphone adapted to translate pressure variations impinging thereon to corresponding impedance variations, means coupling said microphone to said well to repose said microphone to gas pressure in the well, a circuit including a source of alternating current of a frequency many times greater than the frequency of the echoes desired to be translated, said circuit including said microphone so disposed therein as to vary the alternating current therein in accordance with pressure variations impinging on said microphone, rectifying means coupled to said circuit to produce a direct current, the amplitude of which varies in accordance with the varied alternating current in said circuit, and means coupled to said rectifier and responsive to variations in the amplitude of said direct current for describing an observable wave pattern reproduction of the pressure variations in said well.

7. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said circuit including said microphone so disposed therein as to vary the alternating current therein in accordance with pressure variations impinging on said microphone, means coupled to said circuit and responsive to variations of said alternating current in said circuit for describing an observable wave pattern reproduction of the pressure variations in said well, and means associated with said circuit for adjusting the natural period of oscillation of said circuit to produce a direct current from said rectifier approximately midway between the normal operating maximum and minimum values when said microphone is subjected only to static pressures.

8. In a system for receiving and translating pressure echoes from a well, a microphone adapted to translate pressure variations impinging thereon to corresponding electrical variations, means coupling said microphone to said well to expose said microphone to gas pressures in the well, a circuit capable of being tuned relative to a selected frequency many times greater than the frequency of the echoes desired to be translated, means supplying said circuit with current at said selected frequency, said circuit including said microphone so disposed therein as to impose the electrical variations produced by said microphone upon the current in said circuit, and means coupled to said circuit and responsive to variations of current in said circuit for describing an observable wave pattern reproduction of the pressure variations in said well.

9. In a system for receiving and translating pressure echoes from a well, a microphone adapted to translate pressure variations impinging thereon to corresponding electrical variations, means coupling said microphone to said well to expose said microphone to the gas pressure in the well, a circuit capable of being tuned relative to a selected frequency many times greater than the frequency of the echoes desired to be translated, means supplying said circuit with a current at said selected frequency, said circuit including said microphone so disposed therein as to act as a tuning means tending to tune and de-tune said circuit relative to said supplied frequency as the circuit is affected by the electrical variations produced by said echoes, to thereby accordingly vary the current of said circuit, and means coupled to said circuit for receiving varying current from said circuit and for describing an observable wave pattern reproduction of the pressure variations impinging on said microphone.

10. In a system for receiving and translating pressure echoes from a well, a microphone adapted to translate pressure variations impinging thereon to corresponding impedance variations, means coupling said microphone to said well to expose said microphone to gas pressure in the well, a circuit including a source of alternating current of a frequency many times greater than the frequency of the echoes desired to be translated, said microphone being so disposed in said circuit as to vary the normal high frequency of the current imposed on the circuit by said source in accordance with the pressure variations impinging on said microphone, a resonant circuit coupled to receive alternating current from said first circuit and tuned to a fixed frequency which is slightly outside of the range between the maximum and minimum frequencies caused in said first circuit by said pressure variations, whereby the magnitude of current in said resonant circuit is varied in accordance with said pressure variations, and means coupled to said resonant circuit and responsive to variations in the magnitude of said alternating current for describing an observable wave pattern reproduction of the pressure variations in said well.

11. In a system for receiving and translating pressure echoes from a well, a microphone adapted to vary its impedance in correspondence with pressure variations impinging thereon, means for coupling said microphone to said well to expose said microphone to the gas pressures in the well, a balanced bridge circuit including a half wave rectifier in each branch thereof, and a direct current translating device connected across said branches for receiving the unbalanced output of said rectifiers and for describing therefrom a wave pattern corresponding to the pattern of the pressure waves received upon said microphone, means for supplying a current at a frequency many times greater than the frequency of the pressure echoes desired to be translated means coupling said source to each of said branches, and means interposing said microphone in the coupling to one branch whereby said bridge circuit will be unbalanced in accordance with variations in said pressure waves.

12. In a system for receiving and translating pressure echoes from a well, a microphone adapted to translate pressure variations impinging thereon to corresponding impedance variations means coupling said microphone to said well to expose said microphone to gas pressure in the well, a circuit including a source of alternating current of a frequency many times greater than the frequency of the echoes desired to be translated, said circuit including said microphone s disposed therein as to vary the alternating current therein in accordance with pressure variations impinging on said microphone, rectifying means coupled to said circuit to produce a direct current, the amplitude of which varies in accordance with the varied alternating current in said circuit, means coupled to said rectifier and responsive to variations in the amplitude of said direct current for describing an observable wave pattern reproduction of the pressure variation in said well, and means interposed between said rectifier and said last named means for accentuating the periodically recurring echoes from a series of similar obstructions spaced substantially uniformly along the well over pressure variations emanating from other sources.

CRANFORD P. WALKER.